(12) United States Patent
Bretschneider et al.

(10) Patent No.: US 10,606,719 B2
(45) Date of Patent: *Mar. 31, 2020

(54) MIRRORING WRITES OF RECORDS TO MAINTAIN ATOMICITY FOR WRITING A DEFINED GROUP OF RECORDS TO MULTIPLE TRACKS

(71) Applicant: International Business Machines Corporation, Armonk, NY (US)

(72) Inventors: Ronald E. Bretschneider, San Martin, CA (US); John R. Paveza, Morgan Hill, CA (US); Beth A. Peterson, Tucson, AZ (US); Max D. Smith, Tucson, AZ (US); Gail A. Spear, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/444,088

(22) Filed: Feb. 27, 2017

(65) Prior Publication Data
US 2018/0246792 A1 Aug. 30, 2018

(51) Int. Cl.
G06F 11/20 (2006.01)
G06F 3/06 (2006.01)

(52) U.S. Cl.
CPC .......... *G06F 11/2058* (2013.01); *G06F 3/065* (2013.01); *G06F 3/067* (2013.01); *G06F 3/0619* (2013.01); *G06F 11/2064* (2013.01)

(58) Field of Classification Search
CPC .... G06F 11/2058; G06F 3/0619; G06F 3/065; G06F 3/067; G06F 11/1451; G06F 2201/84
See application file for complete search history.

(56) References Cited

U.S. PATENT DOCUMENTS 7,065,623 B2 * 6/2006 Chen ................. G06F 3/0626
710/33
7,293,048 B2 11/2007 Cochran et al.
(Continued)

OTHER PUBLICATIONS

B. Ward, "Data Corruption and Recovery Issues", dated 2005, Chapter 2, SQL Server 2005 Storage Internals, Total 90 pages.
(Continued)

*Primary Examiner* — Yaima Rigol
(74) *Attorney, Agent, or Firm* — David W. Victor; Konrad Raynes Davda & Victor LLP

(57) ABSTRACT

Provided are a computer program product, system, and method for mirroring writes of records to maintain atomicity for writing a defined group of records to multiple tracks. Sub-writes are received from a host system to write records in defined groups in a write, wherein at least one of the sub-writes includes records to write for at least one of the defined groups that spans multiple tracks. For each of the sub-writes including records for at least one of the defined groups that spans multiple tracks, the tracks in the sub-write with to the secondary storage system to cause the secondary storage system to apply the tracks upon receiving all the tracks for the sub-write. Complete is returned for the sub-write to the host system upon receiving confirmation from the secondary storage system that all the tracks for the sub-write have been applied to the secondary storage system.

23 Claims, 8 Drawing Sheets

(56) References Cited

U.S. PATENT DOCUMENTS

| | | | |
|---|---|---|---|
| 7,620,660 B2 | 11/2009 | Kodavalla et al. | |
| 7,689,607 B2 | 3/2010 | Kodavalla et al. | |
| 8,438,332 B2 | 5/2013 | Ash et al. | |
| 2004/0168024 A1* | 8/2004 | Buckingham | G11B 20/12 711/111 |
| 2005/0198638 A1* | 9/2005 | Bai | G06F 11/1443 718/100 |
| 2007/0050573 A1* | 3/2007 | Arakawa | G06F 11/2058 711/162 |
| 2008/0059738 A1* | 3/2008 | Burr | G06F 11/2064 711/162 |
| 2010/0036978 A1* | 2/2010 | Candelaria | G06F 13/126 710/24 |
| 2014/0089599 A1* | 3/2014 | Okawara | G06F 9/3017 711/140 |
| 2015/0213099 A1* | 7/2015 | Rinke | G06F 17/30575 707/634 |
| 2016/0063083 A1* | 3/2016 | Mu | G06F 17/30581 707/610 |

OTHER PUBLICATIONS

Y. Dar, "Oracle Databases on EMC Symmetrix Storage Systems", dated 2011, EMC Techbooks, Version 1.3, Total 512 pages.

IBM, "DFSMS Using Data Sets", dated 2013, Version 2 Release 1 of z/OS (5650-ZOS), SC23-6855-00, Total 722 pages.

U.S. Patent Application, dated Feb. 27, 2017 for U.S. Appl. No. 15/444,078 (18.686), filed on , invented by Ronald E. Bretschneider et al., Total 37 pages.

U.S. Patent Application, dated May 10, 2016 for U.S. Appl. No. 15/151,121(18.635), filed May 10, 2016, invented by Jeffrey A. Berger et al., Total 33 pages.

U.S. Patent Application, dated May 10, 2016 for U.S. Appl. No. 15/151,128 (18.640), filed May 10, 2016, invented by Jeffrey A. Bergeret al., Total 32 pages.

List of IBM Patents or Patent Applications Treated as Related, Feb. 27, 2017, Total 2 pp.

Office Action, dated Jul. 25, 2018, for U.S. Appl. No. 15/444,078 (18.686), invented by Ronald E. Bretschneider et al., Total 26 pages.

Response to Office Action, dated Oct. 25, 2018, for U.S. Appl. No. 15/444,078 (18.686), invented by Ronald E. Bretschneider et al., Total 13 pages.

Final Office Action, dated Nov. 5, 2018, for U.S. Appl. No. 15/444,078 (18.686), invented by Ronald E. Bretschneider et al., Total 23 pages.

Response to Final Office Action, dated Feb. 5, 2019, for U.S. Appl. No. 15/444,078 (18.686), invented by Ronald E. Bretschneider et al., Total pages. 13.

Office Action, dated Jul. 18, 2019, for U.S. Appl. No. 15/444,078 (18.686), invented by Ronald E. Bretschneider et al., Total 25 pages.

Response to Office Action, dated Oct. 18, 2019, for U.S. Appl. No. 15/444,078 (18.686), invented by Ronald E. Bretschneider et al., Total 14 pages.

Notice of Allowance dated Nov. 20, 2019, p. 13, for U.S. Appl. No. 15/444,078.

* cited by examiner

MIRRORING WRITES OF RECORDS TO MAINTAIN ATOMICITY FOR WRITING A DEFINED GROUP OF RECORDS TO MULTIPLE TRACKS

BACKGROUND OF THE INVENTION

1. Field of the Invention

The present invention relates to a computer program product, system, and method for mirroring writes of records to maintain atomicity for writing a defined group of records to multiple tracks.

2. Description of the Related Art

Certain type of write operations require that an entire logical grouping of data be written completely before complete is returned for a write. For instance, certain applications such as the International Business Machines Corporation ("IBM") DB2® and Storage Access Methods, such as VSAM (Virtual Storage Access Mechanism) write portions of data to disk storage that may comprise subsets of a larger construct of data. For instance, DB2 writes pages which are portions of a tablespace and VSAM writes control intervals, which are portions of files or data sets. (DB2 is a registered trademark of IBM throughout the world). When software writes a database page or control interval to storage, there is an assumption that the write will be atomic such that the entire data group, e.g., page or control interval, will either be completely written successfully or not written at all. If a page or control interval is read that has been only partially updated, the database or software application may flag an error and consider the page or control interval as corrupted. In such case, there is currently no recovery mechanism and the page/control interval must be restored from a good backup copy. In other cases, the page or control interval may be in a corrupted state the software cannot detect, which results in a data integrity error.

There is a need in the art for improved techniques for processing of defined groups of data or records to ensure data integrity.

SUMMARY

Provided are a computer program product, system, and method for mirroring writes of records to maintain atomicity for writing a defined group of records to multiple tracks. Sub-writes are received from a host system to write records in defined groups in a write, wherein at least one of the sub-writes includes records to write for at least one of the defined groups that spans multiple tracks. For each of the sub-writes including records for at least one of the defined groups that spans multiple tracks, the tracks in the sub-write with to the secondary storage system to cause the secondary storage system to apply the tracks upon receiving all the tracks for the sub-write. Complete is returned for the sub-write to the host system upon receiving confirmation from the secondary storage system that all the tracks for the sub-write have been applied to the secondary storage system.

DETAILED DESCRIPTION

A data group or logical construct of data, such as a page or control interval, may be comprised of numerous records that span multiple tracks or split across a track boundary. A host write to the defined group may be interrupted by a host crash, datacenter power loss, storage crash, or communication failure. Similarly, a write to a mirrored disk copy may be interrupted by equipment failure, power failure or a true disaster. The mirrored copy may be written via synchronous or asynchronous mirroring. Storage controllers may guarantee write atomicity for a write or for a collection of records within a track, but there is a need in the art to maintain atomicity to guarantee completion of mirroring a defined group of records that span tracks, so complete is not returned until records are mirrored for all the tracks spanned by the defined group being written. A "torn page" results when complete is returned when only a portion of the records for a defined group are mirrored and the remainder of the records for the defined group do not get mirrored to a next track, so that the entire defined group is not completely mirrored to a remote site. If there is a torn page, or torn defined group spanning multiple tracks, there is an exposure to data loss if complete is returned before mirroring the data to all the tracks for the defined group to the mirror copy.

Described embodiments provide techniques to provide atomicity for mirroring defined groups of data in a write request when at least one of the defined groups includes records that span multiple tracks. In such case, sub-writes are generated to mirror records for at least one defined group that spans multiple tracks, such that a storage system upon processing a sub-write does not return complete until records have been mirrored for all the tracks written to by the sub-write. A hint may be included with those sub-writes for which complete is not returned until completing mirroring for all the tracks spanned by the sub-write. This ensures that atomicity for mirroring groups that span tracks is guaranteed by dividing a large write of multiple defined groups into sub-writes for which atomicity can be ensured for mirroring each logical defined group of data, such as a page, control interval, etc., contained within a sub-write.

Figure 1:
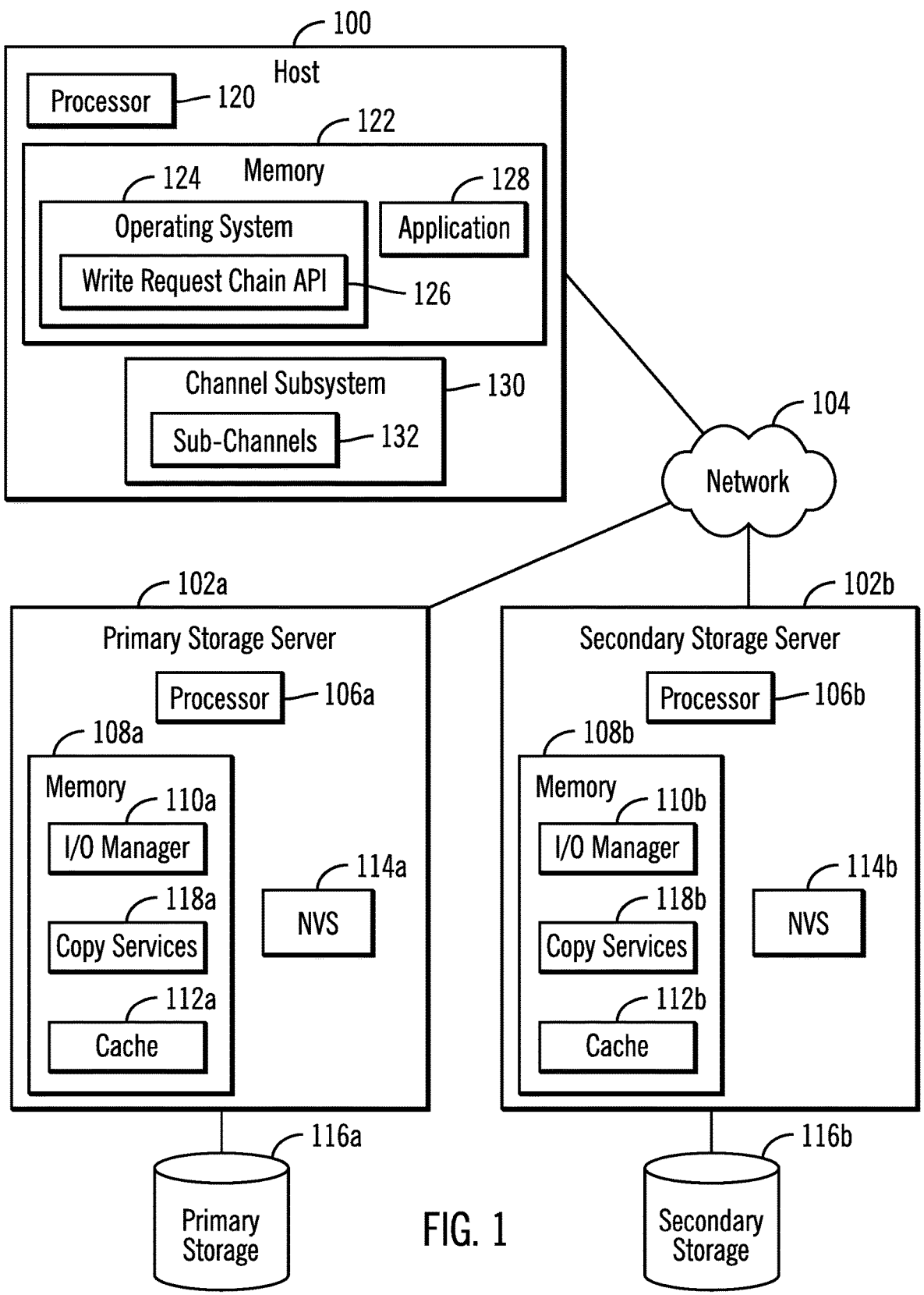
FIG. 1 illustrates an embodiment of a storage environment.

FIG. 1 illustrates an embodiment of a mirror or single copy storage environment having a host 100, primary storage server 102a, and secondary storage server 102b that communicate over a network 104. The storage servers 102a, 102b each include a processor 106a, 106b, system memory 108a, 108b, having Input/Output (I/O) managers 110a, 110b that manage write requests from the host 100, and cache 112a, 112b, as well as a non-volatile storage device (NVS) 114a, 114b. Write data in the caches 112a, 112b may be backed-up in the NVS 114a, 114b in the same server 102a, 102b, respectively. Alternatively, a cache 112a, 112b in one storage server 102a, 102b may backup writes in the NVS 114b, 114a of the other storage server 102b, 102a, respectively. A primary storage 116a is coupled to the primary storage server 102a and a secondary storage 116b is coupled to the secondary storage server 102b. The I/O managers 110a, 110a b manage I/O requests from the host 100 directed to data in the attached storages 116a, 116b.

The term "primary storage system" as used herein may refer to the primary storage server 102a and/or the primary storage 116a and the term "secondary storage system" as used herein may refer to the secondary storage server 102b and/or the secondary storage 116b.

The host 100 includes a processor 120, a system memory 122, and an operating system 124 including includes a write request chain Application Programming Interface (API) 126 to generate write request chains of ordered write requests to process writes from applications 128 executing in the host 100 or other systems in the network 104 submitting I/O requests to the host 100.

In one embodiment, the storage servers 102a, 102b include copy services 118a, 118b to mirror/synchronize host 100 writes to the secondary storage sever 102b to write to the secondary storage 116b. In such embodiments, a host write operation does not complete and is not committed until data for a track is confirmed to have been written to the primary 116a and secondary 116b storages. The I/O manager 110a may not confirm complete to the host 100 until completing writing the data for a track to the primary 116a and secondary storages 116b. Alternatively, the I/O manager 110a may confirm complete upon storing the write data for a track in the cache 112a, 112b and/or NVS 114a, 114b in the storage servers 102a, 102b before the data is written to the storage 116a, 116b.

In another embodiment, the server 102a may not synchronize writes to the secondary storage server 102b and operate as in an environment without the secondary storage server 102b. In such case, write complete or commit indicates the write data is committed in the storage 116a or cache 112a and/or /NVS 114a or 14b.

A "track" as that term is used herein may comprise any unit of data written to physical storage, including a track, logical block address, and other types of data units.

The storage servers 102a and 102b may be comprised of an enterprise storage server suitable for managing access to attached storage devices, such as the International Business Machine Corporation's ("IBM") DS8000® storage system. (DS8000 is a registered trademark of IBM in countries throughout the world). The host 100 operating system 124 may comprise an operating system such as Z Systems Operating System (Z/OS®) from International Business Machines Corporation ("IBM") or other operating systems known in the art. (Z/OS is a registered trademark of IBM throughout the world).

The network 104 may comprise a Storage Area Network (SAN), Local Area Network (LAN), Intranet, the Internet, Wide Area Network (WAN), peer-to-peer network, wireless network, arbitrated loop network, etc.

The storages 116a, 116b may each comprise one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices comprising the storages 116a, 116b may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

In one embodiment, the host 100 operating system 124 may include a channel subsystem 130, which has sub-channels 132 that provide the information needed to access the server 102a and underlying storage 116a in which volumes are configured. The storage server 102a, 102b I/O managers 110a, 110b may include Unit Control Blocks (UCBs) that provide a software representation of the underlying volumes, and point to the sub-channel 132 that has the information on how to access the device including the volume addressed by the UCB. IN other embodiments, the host 100 may not include a channel subsystem 130 and sub-channel to access the server 102a.

Figure 2:
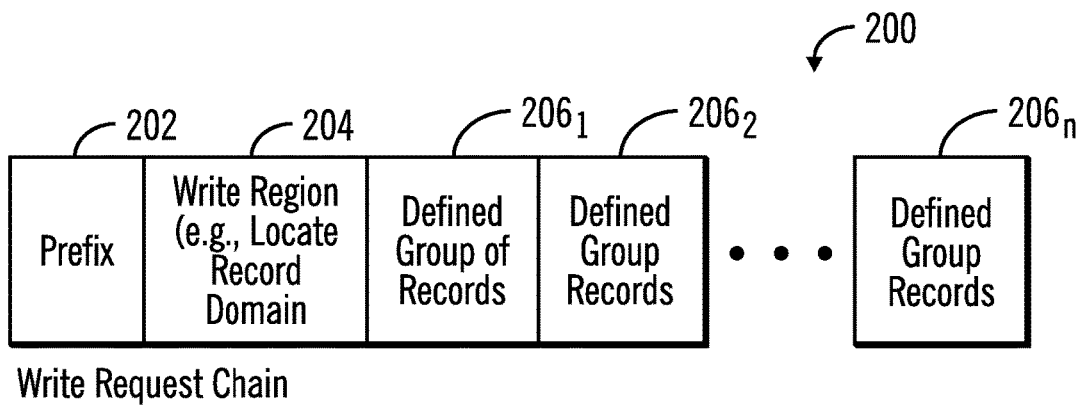
FIG. 2 illustrates an embodiment of a write request chain.

FIG. 2 illustrates an embodiment of a write request chain 200 produced by the write request chain API 126 executing in the operating system 124, or another connected host system that includes a prefix 202 having information on a defined group size; a write region 204 indicating portions of tracks in the primary storage 116a to which the defined groups $206_1 \ldots 206_n$ in the write chain 200 of records are written; and defined groups $206_1, 206_2 \ldots 206_n$ of records to write to the locations in the tracks defined in the write region 204. A defined group may comprise an grouping construct of data units, such as groupings of records, tracks, and other types of data units.

The host API 126 may define sub-writes for the defined groups $206_j$ in the received write request chain 200 such that the each sub-write includes a predetermined number of defined groups $206_1, 206_2 \ldots 206_n$ that span multiple tracks, such that each of the sub-writes include up to the predetermined number of defined groups spanning tracks in the storage. The sub-writes are generated such that for those sub-writes having the predetermined number of defined groups that span multiple tracks, the secondary server storage system waits to return complete for writing a track in response to completing writing to all the tracks spanned by the sub-write. A sub-write may include defined groups $206_j$ that do not span tracks as well as up to the predetermined number of defined groups $206_j$ that do span tracks.

Figure 3:
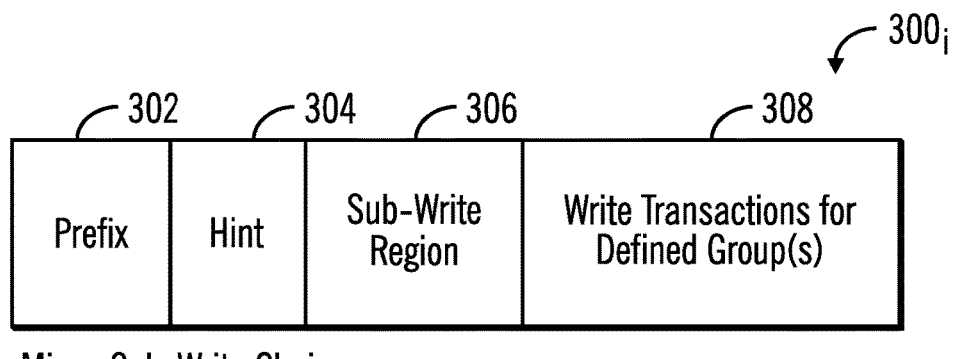
FIG. 3 illustrates an embodiment of a mirror sub-write chain.
Figure 4:
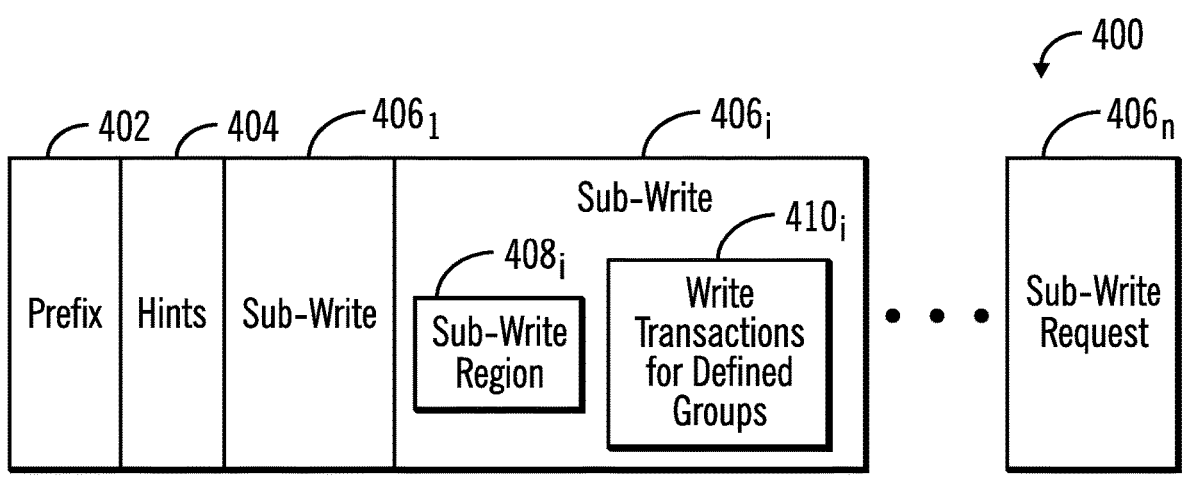
FIG. 4 illustrates an embodiment of a mirror write chain.

FIGS. 3 and 4 illustrates different embodiments for generating the sub-writes as separate self-contained sub-write chains to send to the secondary storage server 102b as shown in FIG. 3 or as included in single write chain as shown in FIG. 4.

FIG. 3 illustrates an embodiment of a mirror sub-write $300_i$ that the host API 126 or other component generates to transform a received write request 200 from the operating system 124 to multiple sub-write components. A mirror sub write $300_i$ includes a prefix 302 including information on the defined group $206_j$ format, such as size, assigned to the sub-write $300_i$; a hint 304, if generated, to instruct the primary storage server 102a to return complete for writing a track in response to completing writing to all the tracks written to by the sub-write $300_i$; a sub-write region 306 indicating portions of tracks to which the records in the at least one defined group $206_j$ assigned to the sub-write are written; and write transactions 308 to write the records of the defined groups $206_j$ assigned to the sub-write to the secondary storage $116_b$.

FIG. 4 illustrates an embodiment of a mirror write chain 400 that the host API 126 or other component generates to transform a received write request 200 from the operating system 124 to a single write chain 400 that includes the generated sub-writes $406_i$. A mirror write request 400 comprises a write chain including a prefix 402 including information on the format of a defined group $206_j$, such as a size of the defined group; a hint 404, if generated, to instruct the primary storage server 102b for specified sub-writes $406_1 \ldots 406_n$ to return complete only after writing to all the tracks of the specified sub-writes $406_1 \ldots 406_n$. Each sub-write $406_i$ includes a sub-write region $408i$ indicating locations in the tracks written by the sub-write $406i$ and write transactions for defined groups $410_i$ to write the defined groups $206_j$ assigned to the sub-write $406_i$.

The primary I/O manager 110a, upon receiving sub-writes according to FIG. 3 or 4 from the host API 126, will send tracks for each sub-write $306_i$ or $406_i$ one at a time to the secondary storage server 102b with a sequence number for each write transaction within the sub-write $306a_i$ or $406_i$. The secondary I/O manager 110b will ensure that the tracks of the sub-write $306_i$ or $406_i$, sent by the I/O manager 110a, are all applied in sequential order according to the sequence numbers and complete is not returned until all the tracks for the sub-write $306_i$ or $406_i$ are written to ensure atomicity for each sub-write $306_i$ or $406_i$. Once all the tracks in the sub-write $306_i$ or $406_i$ have been transferred successfully to the secondary storage server 102b, the primary I/O manager 110a will signal completion of that sub-write $306_i$ or $406_i$ to the host server 126. At the secondary storage server 102b, the writes are held, but not processed until all tracks of the sub-write $306_i$ or $406_i$ have been received. This is how the atomicity is maintained.

In certain embodiments, tracks may always be transmitted with a sequence number, including those tracks that the secondary storage server 102b does not need to write atomically. In such case, the sequence number for tracks that need to be written atomically, i.e., having defined groups spanning tracks, include indication that the sequence of all the tracks for the sub-write are to be completed writing before complete is returned.

In z/OS embodiments, the prefix 202, 302, 402 may include information on a control interval size, where a control interval (CI) has records in a data set and the write region 204, 306, $408_i$ may comprise a locate record (LR) domain command that specifies a range or group of tracks subject to the writes and write transactions 308, $410_i$ to the tracks identified in the LR domain, where the write transactions are ordered according to a predetermined order of the tracks to which they write, i.e., ascending order. Each locate record domain may specify a location, search argument comprising a track and record within the track, length of data to transfer, and operation types. Further, the locate record domains and write transactions for each sub-write or defined group $206_1, 206_2 \ldots 206_n$ of records to write may be packaged in the prefix parameter or in parameters following the prefix parameters of the command word.

In z/OS embodiments using locate record domains, the host operating system 124 transfers the write request chain 200 to the host API 126 to generate the sub-writes sub-write $306_i$ or $406_i$ which are then sent to a channel subsystem 130 in the host 100 to manage the transfer to the primary storage server 102a. The channel subsystem 130 directs the flow of read and write operations between the host 100 and primary storage server 102a to relieve the host operating system 124 of the task of communicating with the storage server 102a to allow the host operating system 124 to perform data processing and proceed concurrently with the Input/Output (I/O) processing being handled by the channel subsystem. The channel subsystem 130 uses and manages channel paths as communication links from the host 100 to the storage server 102a.

Figure 5:
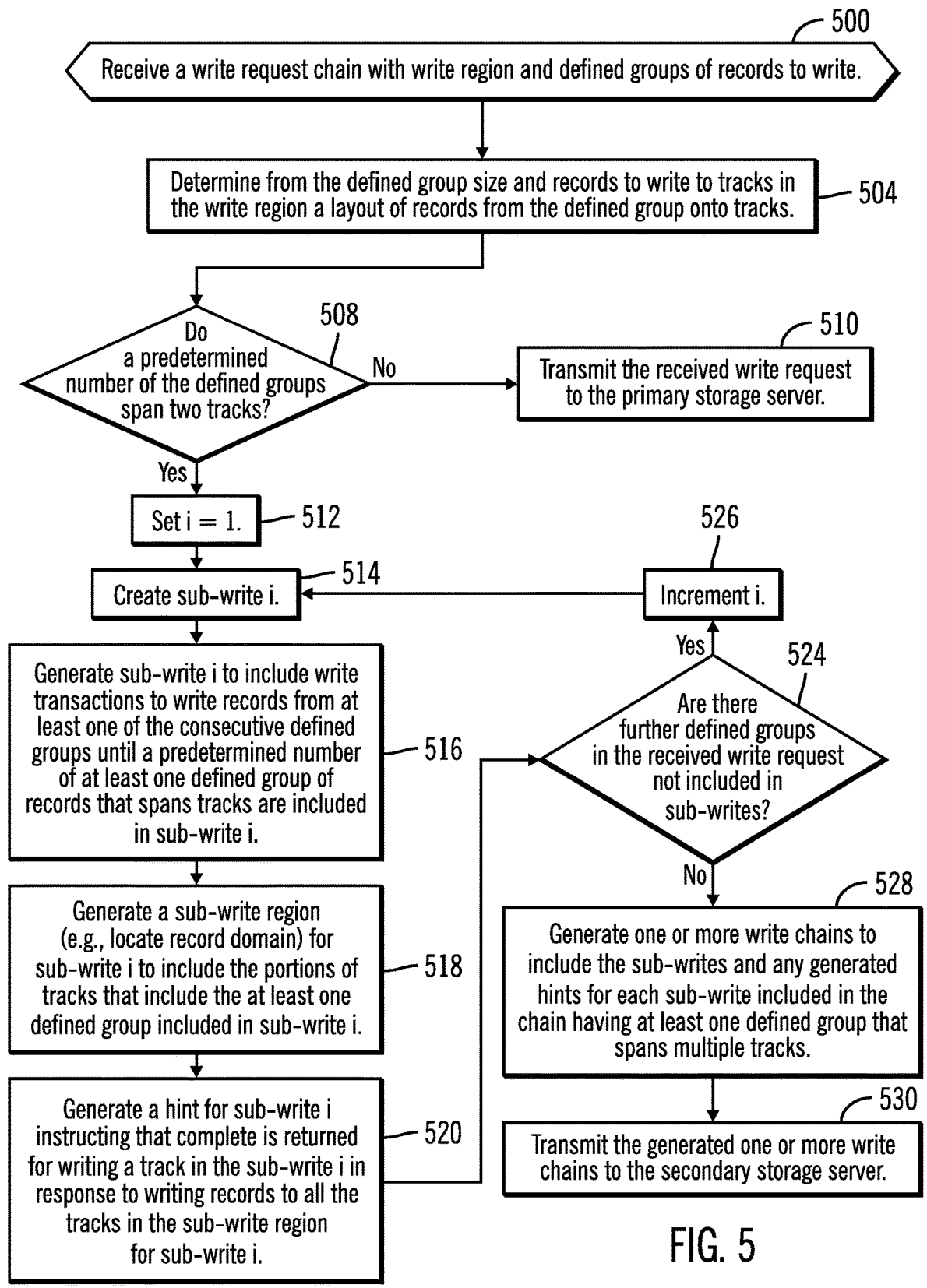
FIG. 5 illustrates an embodiment of operations to construct sub-writes from a write request chain to transmit to a storage system.

FIG. 5 illustrates an embodiment of operations performed by the host API 126 to process a write request chain 200 from the host 100. Upon receiving (at block 500) the write request chain 200, the host API 126 determines (at block 504) from the defined group size in the prefix 202, from the start location for writing in the write region 204, and records in the defined groups $206_1, 206_2 \ldots 206_n$ to write to tracks in the write region 204, a layout of records from the defined groups $206_1, 206_2 \ldots 206_n$ onto tracks in the write region 204. The determined layout may show defined groups $206_1, 206_2 \ldots 206_n$ that span two tracks.

In z/OS, embodiments, the prefix command 202 provides information on the size of the page or control interval, e.g., defined group $206_j$, which when combined with the track format information (stored in the primary storage server 102a) and the starting point of the Locate Record domain, will allow the host API 126 to calculate if and when a control interval (CI) or page crosses a track boundary. For example, if there are three 16 KB records on the track, the control interval size is 32 KB, and the locate record (LR) domain starts with Record 1, then the I/O manager 110a can determine that the first control interval will be contained fully within the track but the second control interval will cross a track boundary.

If (at block 508) the layout shows that there are not a predetermined number of the defined groups $206_1, 206_2 \ldots 206_n$ that span multiple tracks, then the host API 126 transmits (at block 510) the received write request 200 to the primary storage server 102b to write to the secondary storage 116b without requiring completion of writing all tracks for a defined group $206_j$ before returning complete to writing one track. In this way, if the received write request 200 does not have the predetermined number of defined groups $206_1, 206_2 \ldots 206_n$ that span multiple tracks, then the secondary storage server 102b may return complete to writing records to a track when completing writing to one track, i.e., atomicity is not required. The predetermined number of defined groups $206_j$ that spans tracks may comprise a pre-configured number, such as one or any other number. In certain embodiments, each sub-write may include no more than the predetermined number of defined groups $206_j$ that span multiple tracks in the layout.

If (at block 508) the layout shows that a predetermined number of the defined groups $206_1, 206_2 \ldots 206_n$ spans two tracks, then the host API 126 sets (at block 512) i to 1 and creates (at block 514) sub-write $300_i$ or $406_i$, where mirror sub-write $300_i$ is generated if each sub-write $300_i$ comprises a separate write chain and sub-write $406_i$ is generated if the sub-writes $406_i$ are included in a single mirror write chain 400. The host API 126 generates (at block 516) sub-write $300_i$ or $406_i$ to include write transactions $410_i$ to write records from at least one of the consecutive defined groups $206_j$ until a predetermined number of at least one defined group $206_j$ of records that spans tracks are included in sub-write $300_i$ or $406_i$. A sub-write region $306_i$ or $408_i$ (e.g., locate record domain) is generated (at block 518) for sub-write $300_i$ or $406_i$ to indicate the portions of tracks that include the at least one defined group $206_j$ included in sub-write $300_i$ or $406_i$. The host API 126 generates (at block 520) a hint 304 or 404 for sub-write $300_i$ or $406_i$ instructing that complete is returned for writing a track for the sub-write $300_i$ or $406_i$ in response to writing records to all the tracks in the sub-write region 306 or $408_i$ for sub-write $300_i$ or $406_i$.

If (at block 524) there are further defined groups $206_j$ in the received write request 200 not yet included in sub-writes $300_i$ or $406_i$, then i is incremented (at block 526) and control proceeds to block 514 to create a next sub-write $300_i$ or $406_i$. If (at block 524) there are no further defined groups $206_j$ not included in sub-writes $300_i$ or $406_i$, then the host API 126 generates (at block 528) one 400 or multiple $300_i$ write chains to include the sub-writes $300_i$ or $406_i$ and any generated hints 304 or 404 for each sub-write included in the chain having the predetermined number of at least one defined group that spans multiple tracks. The host API 126 transmits (at block 530) the generated one 400 or more $300_i$ write chains to the primary storage server 102a for mirroring to the secondary storage sever 102b.

With the operations of FIG. 5, sub-writes $300_i$ or $406_i$ are generated to each not include more than a predetermined number of defined groups that span tracks. In one embodiment, the predetermined number may comprise one defined group that spans multiple tracks such that each of the sub-writes is limited to including no more than one defined group that spans multiple tracks. In a further implementation, each sub-write may include one defined group that spans multiple tracks and multiple of the sub-write $300_i$ or $406_i$ may write to different portions of a same track. Further, a sub-write $300_i$ or $406_i$ may include any number of defined groups that will not span multiple tracks when written. Hints 304 and 404 are not generated for those sub-writes that do not include defined groups that span tracks, such that complete may be returned when writing one track even if the sub-write is to write to multiple tracks without having defined groups $206_j$ that will span tracks when written.

In a further embodiment, to allow parallel processing, the host API 126 may recognize that multiple addresses may be used to address one volume to allow parallel execution of operations simultaneously against the different volume addresses, such as parallel access volumes. The parallel access volume (PAV) addresses used to address a single volume may be assigned to different sub-writes sent to the primary storage server 102a to allow the primary I/O manager 110a to simultaneously execute the received sub-writes $300_i$ or $406_i$ to tracks using the different parallel access volume addresses to simultaneously access non-overlapping portions of the tracks for the sub-writes.

Figure 6:
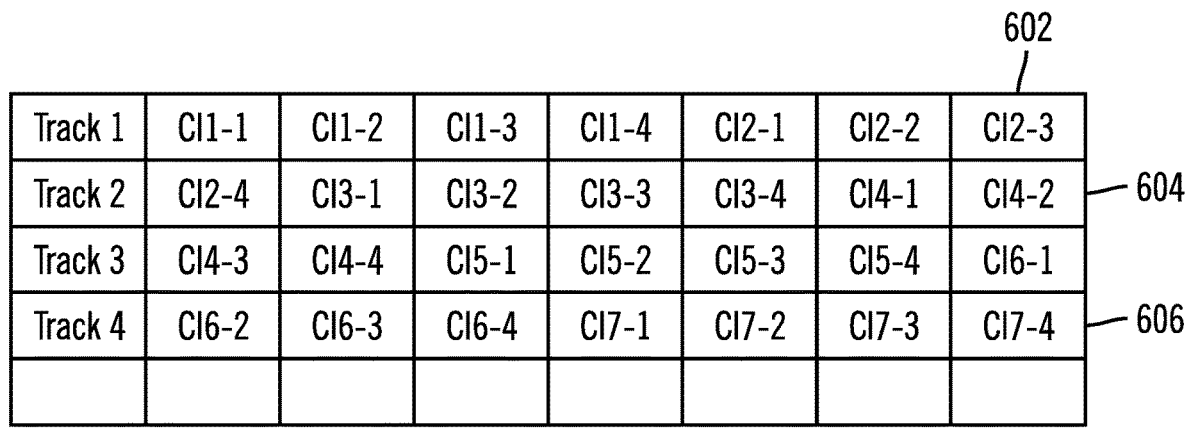
FIG. 6 illustrates an example of how control intervals span tracks and are organized in sub-writes.

FIG. 6 illustrates an example of how records, e.g., CI1-1, for three different defined groups, referred to as control interval (CI), are written across tracks. The reference CIi-j refers to control interval i, record j. Each of the control intervals CI1, CI2, CI3, CI4, CI5, CI6, CI7 each include four records, j=1, 2, 3, 4. Each sub-write 602, 604, 606 or single locate record (LR) domain, is shown as including two control intervals (defined groups), one that spans multiple tracks. For instance, a first sub-write 602 (e.g., locate record domain) includes the records for control intervals CI1 and CI2, with the records of CI2, such as record CI2-4, spanning tracks 1 and 2. Sub-write 604 includes the records for control intervals CI3 and CI4, with the records of CI4, such as record CI4-3, spanning tracks 2 and 3, and sub-write 606 includes the records for control intervals CI5, CI6, and CI7, with the records of CI6, such as record CI6-2, spanning tracks 3 and 4.

Figure 7:
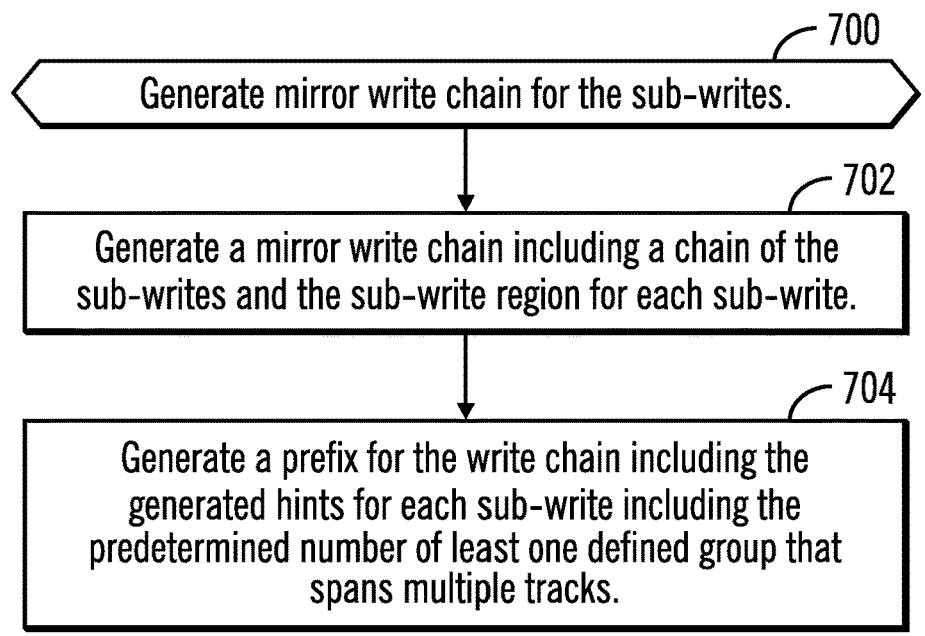
FIG. 7 illustrates an embodiment of operations to generate a mirror write chain having a chain of multiple sub-writes.

FIG. 7 illustrates an embodiment of operations performed by the host API 126 or other component at block 528 in FIG. 5 to generate one mirror write chain 400 for multiple generated sub-writes $406_i$. Upon initiating (at block 700) operations to generate a single write chain 400 for the sub-writes $406_i$, the host API 126 generates (at block 702) a mirror write chain 400 including a chain of the generated sub-writes $406_i$ and the sub-write region $408_i$ for each sub-write 406i. A prefix 402 is generated (at block 704) for the write chain 400 including the generated hints 404 for each sub-write $406_i$ including the predetermined number of least one defined group that spans multiple tracks.

Figure 8:
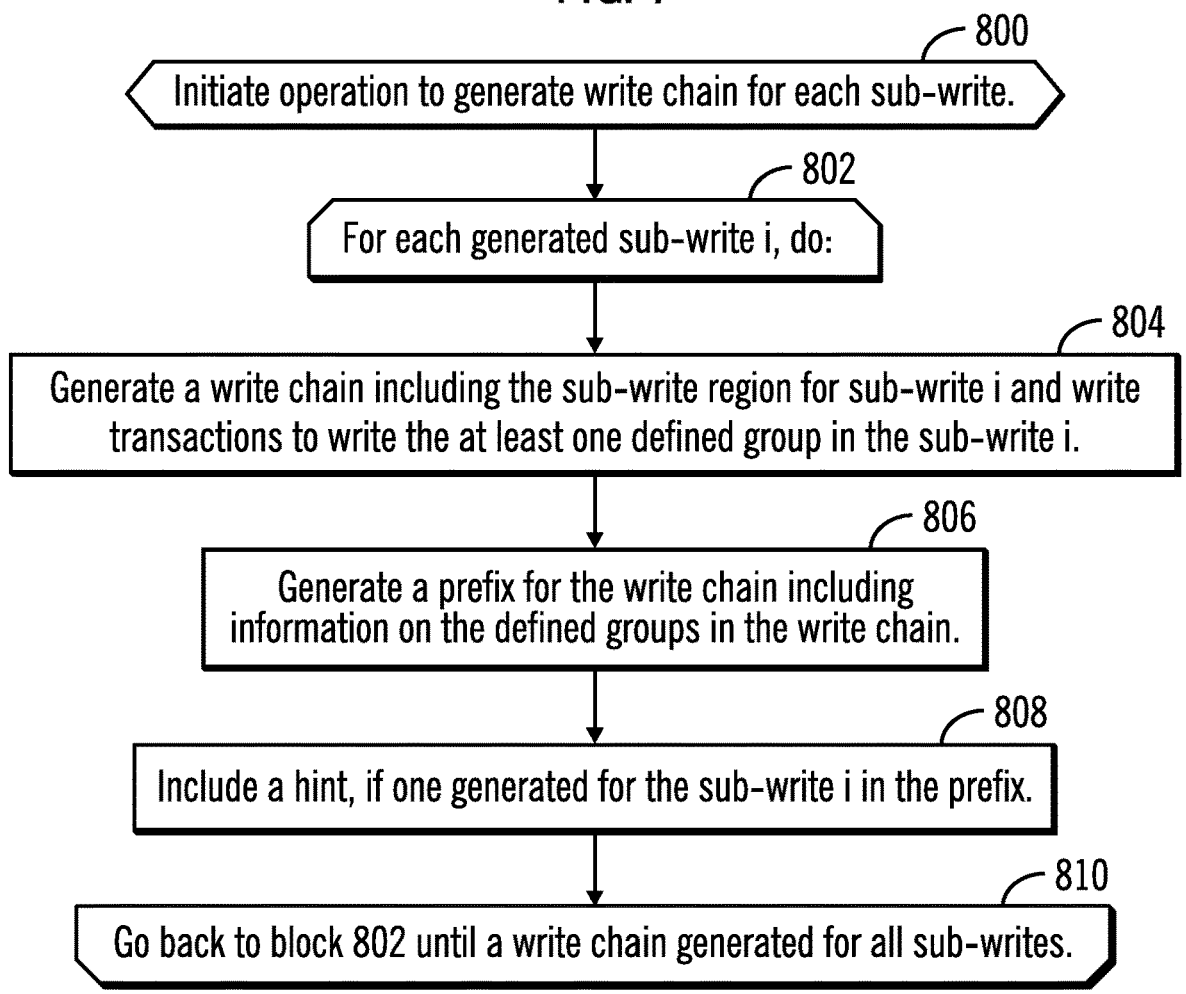
FIG. 8 illustrates an embodiment of operations to generate a sub-write chain.

FIG. 8 illustrates an embodiment of operations performed by the host API 126 or other component at block 528 in FIG. 5 to generate a separate mirror write chain $300_i$ for each generated sub-writes $300_i$. Upon initiating (at block 800) an operation to generate a write chain $300_i$ for each sub-write, a loop of operations is performed at blocks 802 through 810. A write chain $300_i$ is generated (at block 804) including the sub-write region $308_i$ for sub-write $306_i$ and write transactions 308 to write the at least one defined group in the sub-write $300_i$. A prefix 302 is generated (at block 806) for the write chain $300_i$ including information on the defined groups $206_j$ in the sub-write $300_i$. A hint 304 is included in the sub-write $300_i$, if one is generated for the sub-write $300_i$, which may be included in the prefix 302.

In a further alternative embodiment, there may be multiple write chains, each with a separate prefix and hint section, but one or more of the write chains may include multiple sub-writes, such as multiple write chains 400, one or more of which include multiple sub-writes $406_i$ or subsets of the defined groups $206_1, 206_2 \ldots 206_n$ of the received write request 200.

Figure 9:
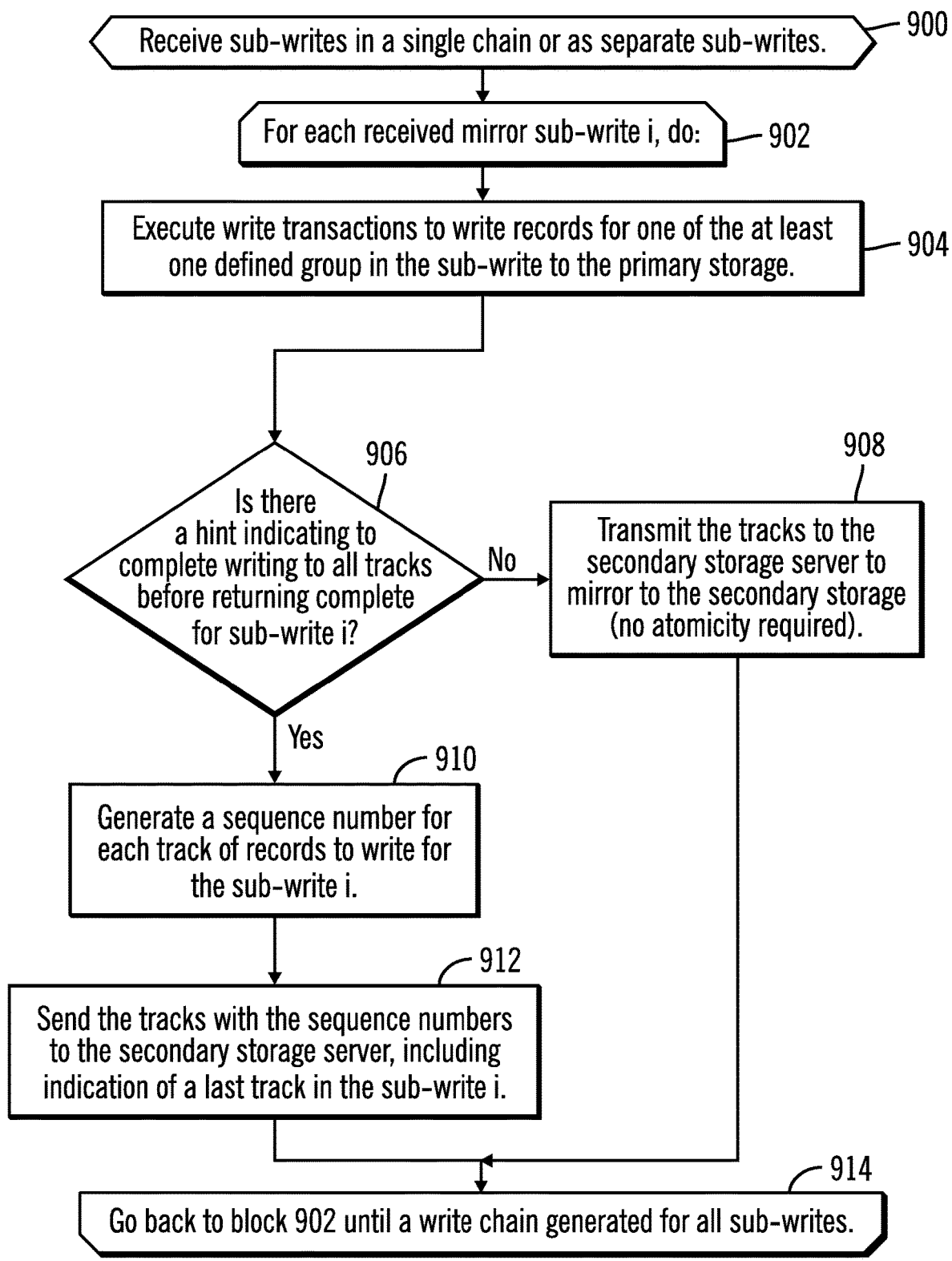
FIG. 9 illustrates an embodiment of operations at a primary storage system to process received sub-writes to mirror to a secondary storage system.

FIG. 9 illustrates an embodiment of operations performed by the I/O manager 110a or copy services 118a or other component at the primary storage server 102a to process sub-writes $300_i$ or $406_i$ received as part of a single write chain 400 or as separate sub-write chains 300i. Upon receiving (at block 900) sub-writes $300_i$ or $406_i$ as part of separate write chains $300_i$ or in a single write chain 400, the I/O manager 110a performs a loop of operations at blocks 902 through 914 for each received sub-write $300_i$ or $406_i$. At block 904, the I/O manager 110b executes write transactions 308 or $410_i$ to write records for one of the at least one defined group in the sub-write $300_i$ or $406_i$ being processed to the primary storage 116a. If (at block 906) there is no hint 304 or 404 indicating to complete writing to all tracks before returning complete for sub-write $300_i$ or $406_i$, then the I/O manager 110a transmits (at block 908) the tracks to the secondary storage server 102b to mirror to the secondary storage 116b without requiring atomicity, i.e., the secondary storage server 102b may return complete upon writing each track of the sub-write $300_i$ or $406_i$.

If (at block 906) the hint is included indicating to complete writing all tracks of the sub-write before returning complete, then the I/O manager 110a generates (at block 910) a sequence number for each track of records to write for the sub-write $300_i$ or $406_i$, which indicates the order of the tracks in the sub-write $300_i$ or $406_i$. The I/O manager 110a sends (at block 912) the tracks of the sub-write $300_i$ or $406_i$ with the sequence numbers to the secondary storage server 102b, including indication of a last track in the sub-write $300_i$ or $406_i$, such as the sequence number of the last track. From block 908 or 912, control proceeds to block 914 to consider any further sub-writes $300_i$ or $406_i$ to process.

Figure 10:
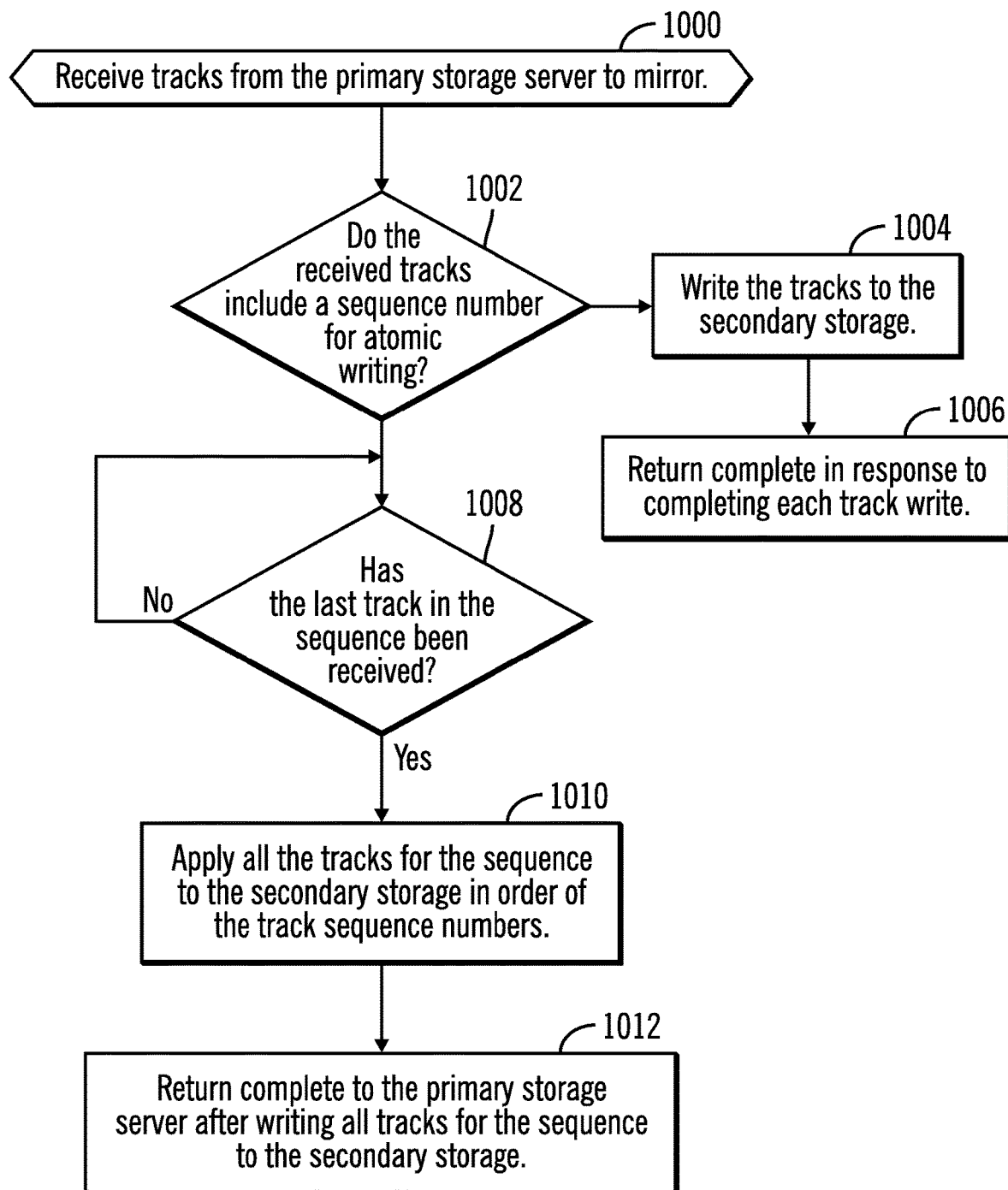
FIG. 10 illustrates an embodiment of operations at a secondary storage system to process received tracks to mirror to a secondary storage.

FIG. 10 illustrates an embodiment of operations performed by the I/O manager 110b or copy services 118b or other component at the secondary storage server 102b to process tracks received from the primary storage server 102a to mirror to the secondary storage 116b. Upon receiving (at block 1000) tracks from the primary storage serer 102a to mirror, if (at block 1002) the received tracks do not include a sequence number for atomic writing, then the I/O manager 110b may write (at block 1004) the tracks to the secondary storage 116b and return (at block 1006) complete in response to completing writing each track, i.e., atomicity is not required.

If (at block 1002) the received tracks include sequence numbers provided for atomic writing, then if (at block 1008) the last track in the sequence to be written has not been received, then the I/O manager 110b waits until all tracks in the sequence are gathered. If (at block 1008) the last track of the sequence has been received, such that all tracks for the sequence have been received, then the I/O manager 110b applies (at block 1010) all the tracks for the sequence to the secondary storage 116b in order of the track sequence numbers. After writing all the tracks for the sequence to the secondary storage 116b, complete is returned (at block 1012) to the primary storage server 102a. The primary storage server 102a upon receiving complete that a sequence of tracks for a sub-write has completed writing then returns complete for the tracks written for defined groups, e.g., control intervals, in received the sub-write $300_i$ or $406_j$. For tracks for which the secondary storage server 102b returns individual completes for each track at block 1006, the primary storage server 102a may return complete to the host 100 upon receiving complete for each of the individual tracks not having defined groups that span the tracks.

The described embodiments provide techniques to construct sub-writes from a write chain writing multiple defined groups of records to ensure atomicity to writing records from one defined group to multiple tracks, such that complete is not returned until all the tracks are updated with the records from the defined group spanning the multiple tracks.

The reference characters used herein, such as i, j, and n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
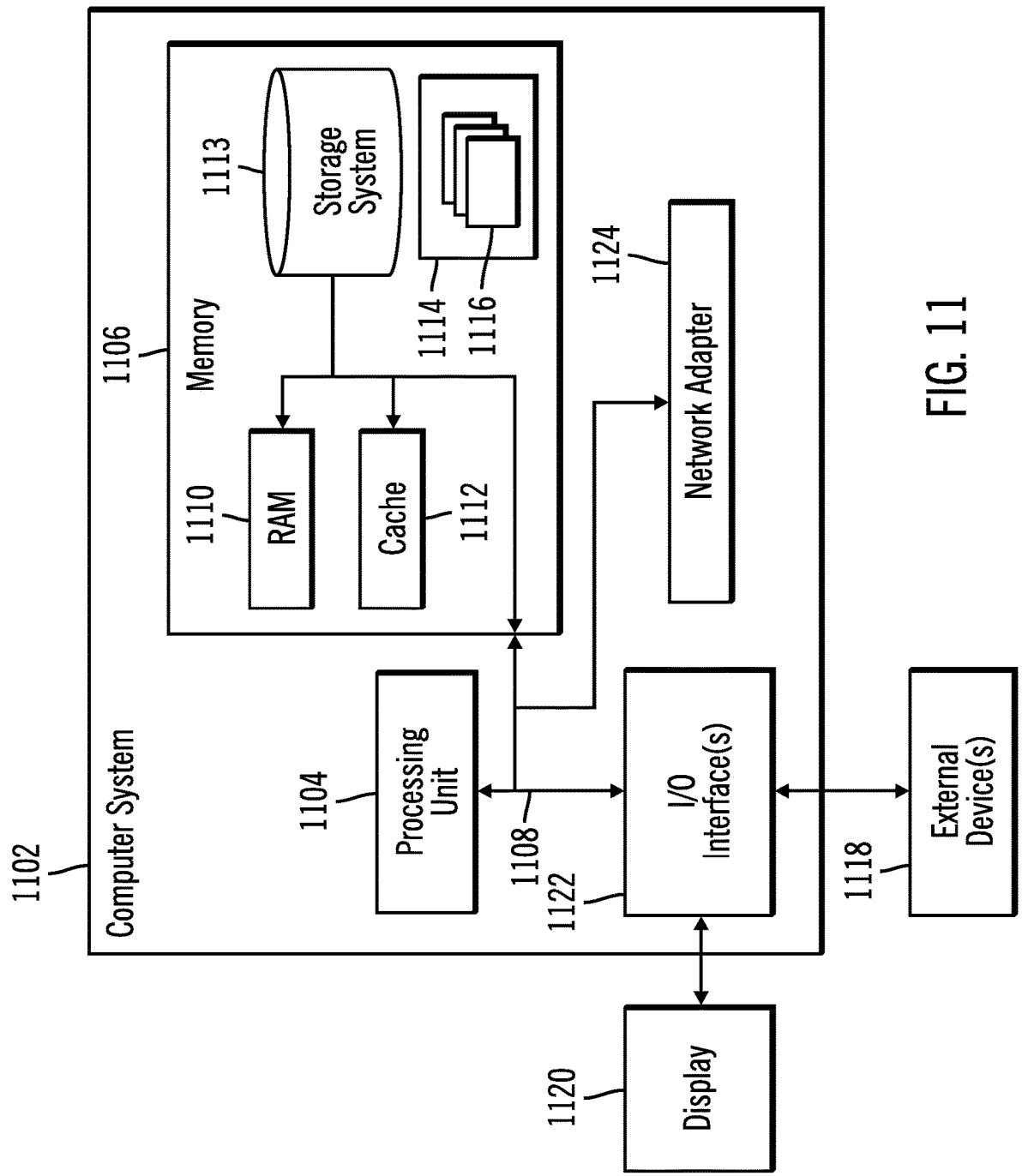
FIG. 11 illustrates a computing environment in which the components of FIG. 1 may be implemented.

The computational components of FIG. 1, including the host 100 and storage servers 102a, 102b may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for mirroring writes from a host system applied to a primary storage system to a secondary storage system, wherein the computer program product comprises a computer readable storage medium having program instructions embodied therewith that when executed by a processor cause operations, the operations comprising:

receiving, from the host system, sub-writes to write records in defined groups in a write, wherein each track of a plurality of tracks store a plurality of records from the write in at least one defined group, wherein a hint is provided for each sub-write of the sub-writes that includes records to write for at least one of the defined groups that spans multiple tracks to indicate that complete is returned after writing all the records of the sub-write for which the hint is provided, and wherein at least one of the sub-writes includes records to write for at least one of the defined groups that is a single track;

for each sub-write of the sub-writes, for which the hint is provided, including records for at least one of the defined groups that spans multiple tracks, transmitting the tracks in the sub-write to the secondary storage system to cause the secondary storage system to apply the tracks upon receiving all the tracks for the sub-write; and returning complete for the sub-write, for which the hint is provided, to the host system upon receiving confirmation from the secondary storage system that all the tracks for the sub-write have been applied to the secondary storage system.

2. The computer program product of claim 1, wherein the operations further comprise:

for each of the sub-writes including records for at least one of the defined groups that spans multiple tracks, generating a sequence number for each of the tracks of the sub-write, wherein the sequence numbers and the tracks are transmitted to the secondary storage system to cause the secondary storage system to write the tracks in order of the sequence numbers.

3. The computer program product of claim 1, wherein the hint instructs the primary storage system to transmit tracks for the sub-write to the secondary storage system with sequence numbers to not complete writing until all the tracks in the sub-write are written to the secondary storage system.

4. The computer program product of claim 3, wherein the operations further comprise:

in response to one of the sub-writes not including the hint, transmitting the tracks to the secondary storage system to cause the secondary storage system to return complete in response to writing each of the tracks.

5. The computer program product of claim 1, wherein the tracks are written to a volume that may be addressed with a plurality of parallel addresses, wherein the sub-writes are directed to the parallel addresses to allow parallel execution of the sub-writes to different locations on the tracks written to by the sub-writes.

6. The computer program product of claim 1, where the sub-writes include sub-write regions, wherein each of the sub-write regions including portions of at least one track including the records to write for the sub-write.

7. The computer program product of claim 6, wherein each of the defined groups comprises control intervals of a data set, wherein each of the control intervals is comprised of a plurality of records, wherein each of the sub-write regions comprises a locate record domain defining portions of the tracks to which the control intervals for the write are written, wherein each of the sub-write regions comprises a locate record domain defining portions of the tracks to which the control intervals for the sub-write are written.

8. The computer program product of claim 1, wherein the receiving the sub-writes comprises receiving a write chain including the sub-writes, and wherein each of the sub-writes defines a locate record domain of a subset of the tracks written to by the sub-write and write transactions to write the records of the sub-writes to portions of the tracks defined in the locate record domain of the sub-write, wherein the write chain includes a hint, for each sub-write having at least one defined group that spans multiple tracks, wherein the tracks in the sub-write are transmitted to the secondary storage system to cause the secondary storage system to apply the tracks upon receiving all the tracks for the sub-write in response to the hint.

9. The computer program product of claim 1, wherein the receiving the sub-writes comprises receiving write chains including one write chain for each of the sub-writes, wherein each of the write chains includes a sub-write region of the sub-write for which the write chain is generated, wherein each of the write chains includes a hint for each sub-write having at least one defined group that spans multiple tracks, wherein the tracks in the sub-write are transmitted to the secondary storage system to cause the secondary storage system to apply the tracks upon receiving all the tracks for the sub-write in response to the hint.

10. A system for mirroring writes from a host system applied to a primary storage system to a secondary storage system, comprising:
   a processor; and
   a computer readable storage medium having program instructions embodied therewith that when executed by the processor cause operations, the operations comprising:
      receiving, from the host system, sub-writes to write records in defined groups in a write, wherein each track of a plurality of tracks store a plurality of records from the write in at least one defined group, wherein a hint is provided for each sub-write of the sub-writes that includes records to write for at least one of the defined groups that spans multiple tracks to indicate that complete is returned after writing all the records of the sub-write for which the hint is provided, and wherein at least one of the sub-writes includes records to write for at least one of the defined groups that is a single track;
      for each sub-write of the sub-writes, for which the hint is provided, including records for at least one of the defined groups that spans multiple tracks, transmitting the tracks in the sub-write to the secondary storage system to cause the secondary storage system to apply the tracks upon receiving all the tracks for the sub-write; and
      returning complete for the sub-write, for which the hint is provided, to the host system upon receiving confirmation from the secondary storage system that all the tracks for the sub-write have been applied to the secondary storage system.

11. The system of claim 10, wherein the operations further comprise:
   for each of the sub-writes including records for at least one of the defined groups that spans multiple tracks, generating a sequence number for each of the tracks of the sub-write, wherein the sequence numbers and the tracks are transmitted to the secondary storage system to cause the secondary storage system to write the tracks in order of the sequence numbers.

12. The system of claim 10, wherein the hint instructs the primary storage system to transmit tracks for the sub-write to the secondary storage system with sequence numbers to not complete writing until all the tracks in the sub-write are written to the secondary storage system.

13. The system of claim 12, wherein the operations further comprise:
   in response to one of the sub-writes not including the hint, transmitting the tracks to the secondary storage system to cause the secondary storage system to return complete in response to writing each of the tracks.

14. The system of claim 10, where the sub-writes include sub-write regions, wherein each of the sub-write regions including portions of at least one track including the records to write for the sub-write.

15. The system of claim 10, wherein the receiving the sub-writes comprises receiving a write chain including the sub-writes, and wherein each of the sub-writes defines a locate record domain of a subset of the tracks written to by the sub-write and write transactions to write the records of the sub-writes to portions of the tracks defined in the locate record domain of the sub-write, wherein the write chain includes a hint, for each sub-write having at least one defined group that spans multiple tracks, wherein the tracks in the sub-write are transmitted to the secondary storage system to cause the secondary storage system to apply the tracks upon receiving all the tracks for the sub-write in response to the hint.

16. The system of claim 10, wherein the receiving the sub-writes comprises receiving write chains including one write chain for each of the sub-writes, wherein each of the write chains includes a sub-write region of the sub-write for which the write chain is generated, wherein each of the write chains includes a hint for each sub-write having at least one defined group that spans multiple tracks, wherein the tracks in the sub-write are transmitted to the secondary storage system to cause the secondary storage system to apply the tracks upon receiving all the tracks for the sub-write in response to the hint.

17. A method computer program product for mirroring writes from a host system applied to a primary storage system to a secondary storage system, comprising:
   receiving, from the host system, sub-writes to write records in defined groups in a write, wherein each track of a plurality of tracks store a plurality of records from the write in at least one defined group, wherein a hint is provided for each sub-write of the sub-writes that includes records to write for at least one of the defined groups that spans multiple tracks to indicate that complete is returned after writing all the records of the sub-write for which the hint is provided, and wherein at least one of the sub-writes includes records to write for at least one of the defined groups that is a single track;
   for each sub-write of the sub-writes, for which the hint is provided, including records for at least one of the defined groups that spans multiple tracks, transmitting the tracks in the sub-write to the secondary storage system to cause the secondary storage system to apply the tracks upon receiving all the tracks for the sub-write; and
   returning complete for the sub-write, for which the hint is provided, to the host system upon receiving confirmation from the secondary storage system that all the tracks for the sub-write have been applied to the secondary storage system.

18. The method of claim 17, further comprising:
   for each of the sub-writes including records for at least one of the defined groups that spans multiple tracks, generating a sequence number for each of the tracks of the sub-write, wherein the sequence numbers and the tracks are transmitted to the secondary storage system to cause the secondary storage system to write the tracks in order of the sequence numbers.

19. The method of claim 17, wherein the hint instructs the primary storage system to transmit tracks for the sub-write to the secondary storage system with sequence numbers to not complete writing until all the tracks in the sub-write are written to the secondary storage system.

20. The method of claim 19, further comprising:
   in response to one of the sub-writes not including the hint, transmitting the tracks to the secondary storage system to cause the secondary storage system to return complete in response to writing each of the tracks.

21. The method of claim 17, where the sub-writes include sub-write regions, wherein each of the sub-write regions including portions of at least one track including the records to write for the sub-write.

22. The method of claim 17, wherein the receiving the sub-writes comprises receiving a write chain including the sub-writes, and wherein each of the sub-writes defines a locate record domain of a subset of the tracks written to by the sub-write and write transactions to write the records of the sub-writes to portions of the tracks defined in the locate record domain of the sub-write, wherein the write chain includes a hint, for each sub-write having at least one defined group that spans multiple tracks, wherein the tracks in the sub-write are transmitted to the secondary storage system to cause the secondary storage system to apply the tracks upon receiving all the tracks for the sub-write in response to the hint.

23. The method of claim 17, wherein the receiving the sub-writes comprises receiving write chains including one write chain for each of the sub-writes, wherein each of the write chains includes a sub-write region of the sub-write for which the write chain is generated, wherein each of the write chains includes a hint for each sub-write having at least one defined group that spans multiple tracks, wherein the tracks in the sub-write are transmitted to the secondary storage system to cause the secondary storage system to apply the tracks upon receiving all the tracks for the sub-write in response to the hint.

* * * * *